(12) United States Patent
Pose (10) Patent No.: US 8,752,618 B2
(45) Date of Patent: Jun. 17, 2014

(54) APPARATUS FOR HANDLING BULKY ARTICLES AT SEA

(75) Inventor: Jean-Baptiste Pose, Aberdeen (GB)

(73) Assignee: Sunsea 7 Contracting (UK) Limited, Westhill (GB)

( * ) Notice: Subject to any disclaimer, the term of this patent is extended or adjusted under 35 U.S.C. 154(b) by 733 days.

(21) Appl. No.: 12/672,949

(22) PCT Filed: Aug. 11, 2008

(86) PCT No.: PCT/GB2008/050695
§ 371 (c)(1),
(2), (4) Date: Jun. 20, 2011

(87) PCT Pub. No.: WO2009/022176
PCT Pub. Date: Feb. 19, 2009

(65) Prior Publication Data
US 2011/0243689 A1    Oct. 6, 2011

(30) Foreign Application Priority Data
Aug. 10, 2007 (GB) .................................. 0715548.4

(51) Int. Cl.
*E21B 19/08* (2006.01)

(52) U.S. Cl.
USPC ......... 166/77.1; 166/78.1; 414/277; 414/279; 414/280

(58) Field of Classification Search
CPC ............... B60P 7/06; B60P 7/08; B60P 7/13; E21B 19/00; E21B 19/08; E21B 19/086; E21B 19/14; E21B 19/143; E21B 19/15; E21B 19/155; F16L 1/15; F16L 1/207
USPC ......... 104/48, 96, 101, 102, 130; 198/377.05, 198/377.06, 379, 406, 407, 408, 409, 412, 198/416, 435, 463.3, 465.1, 465.2, 465.4, 198/468.5, 580, 589, 619, 680, 681, 717, 198/805, 817; 246/381, 430; 414/939, 940, 414/22.51, 22.53, 22.54, 22.62, 222.04, 414/222.05, 222.06, 222.07, 266, 267, 277, 414/280, 286, 663, 664, 665, 666, 667, 668, 414/669, 670, 671, 672, 745.1, 745.2, 414/745.7, 745.8, 746.8, 642; 166/77.1, 166/77.4, 78.1, 79.1, 85.1, 85.5; 405/158, 405/167, 169, 170
IPC ................... B61J 1/00,1/10, 1/12; B65G 47/24, B65G 47/56, 47/60, 47/94, 47/248, 47/252
See application file for complete search history.

(56) References Cited

U.S. PATENT DOCUMENTS

| | | | | |
|---|---|---|---|---|
| 780,049 | A | * | 1/1905 | Maguire .......................... 104/63 |
| 3,788,500 | A | * | 1/1974 | Lemelson .................. 414/792.8 |

(Continued)

FOREIGN PATENT DOCUMENTS

| | | |
|---|---|---|
| EP | 1696163 | 8/2006 |
| WO | WO2004094774 A | 11/2004 |
| WO | WO2005085692 A | 9/2005 |

*Primary Examiner* — Saul Rodriguez
*Assistant Examiner* — Brendan Tighe
(74) *Attorney, Agent, or Firm* — Levy & Grandinetti (57) ABSTRACT

The invention relates to apparatus (10) for handling bulky articles (such as a PLET or ILT (12)) on a deck (14) of a vessel at sea. The apparatus (10) includes a cradle (16) which supports the bulky article (12'), first translational movement means (32 42, 46) provided between the deck (14) and the cradle (16) and second translational movement means (20, 31, 35, 37) moveable along the deck (14). The first translational movement means allows the bulky article (12) to be moved from a storage area and transferred to the second translational movement means, and the second translational movement means allows the bulky article (12) on its cradle (16) to be moved toward an operational location (F). An actuator (26) is also provided between the deck (14) and the cradle (16), in order to adjust the orientation of the bulky article (12) relative to the deck (14), when in the operational position. A method of handling bulky articles on a deck of a vessel at sea is also provided.

24 Claims, 10 Drawing Sheets

(56) References Cited

U.S. PATENT DOCUMENTS

| | | | |
|---|---|---|---|
| 3,860,122 A | 1/1975 | Cernosek | |
| 4,016,991 A * | 4/1977 | Oldford | 414/400 |
| 6,179,541 B1 * | 1/2001 | Rioux et al. | 414/282 |
| 6,537,014 B1 * | 3/2003 | Ridgdill | 414/482 |
| 6,648,572 B2 * | 11/2003 | Piazza | 414/276 |
| 6,902,007 B1 * | 6/2005 | Orr et al. | 166/379 |
| 7,118,314 B2 * | 10/2006 | Zhou et al. | 410/84 |
| 7,189,028 B1 | 3/2007 | Signaroldi et al. | |
| 2007/0189857 A1 * | 8/2007 | Vergouw et al. | 405/166 |
| 2009/0324339 A1 * | 12/2009 | Roodenburg et al. | 405/166 |

\* cited by examiner

APPARATUS FOR HANDLING BULKY ARTICLES AT SEA

FIELD & BACKGROUND DISCUSSION

The present invention is concerned with apparatus for handling bulky articles at sea, particularly, but not exclusively, for handling modules such as pipeline end terminations (PLETs) and in-line tee's (ILTs) around the deck of a pipe laying vessel.

On offshore structures such as oil rigs, pipe laying vessels, drilling vessels, etc. it is often necessary to manoeuvre large bulky articles from one area of the structure to another. An example of when this is necessary is when a module such as a PLET or ILT is moved from a storage area to the firing line of a pipe laying vessel. On typical vessels, movement of the module normally involves using a crane (or series of cranes) to pick up the module clear of the vessel's deck, move it to a point above the desired end position, and then lower the module to that position. However, such crane based systems have a number of disadvantages. The procedure of connecting the crane to the module, moving it to the desired position and lowering the module to the correct position can be slow and difficult to replicate accurately. Furthermore, the process must often take place when a very limited amount of time is available to move the module into position.

The vertical distance by which the module must be raised, combined with the inherent movement of the vessel in the sea causes the module to swing around on the crane in a fashion which can be difficult to control safely. This results in such crane based methods being unsuitable for use in poor weather conditions, leading to unreliability and inefficient use of resources.

According to a first aspect of the present invention, there is provided apparatus for handling bulky articles on a deck of a vessel at sea, the apparatus comprising:
- a cradle for supporting the bulky article;
- first translational movement means provided between the deck and the cradle;
- second translational movement means moveable along the deck, wherein the first translational movement means allows the bulky article to be moved from a storage area and transferred to the second translational movement means, and the second translational movement means allows the bulky article on its cradle to be moved toward an operational location; and
- at least one actuator provided between the deck and the cradle, the actuator being operable to adjust the orientation of the bulky article relative to the deck, when in said operational position.

The apparatus may be provided on a pipelaying vessel and allows the article to be transferred from storage to its operational position, which may be the pipe laying axis, without using a crane to lift the articles into position on the deck of the structure and, once it is at an operational location, allows the bulky article to be orientated and accurately aligned using the actuator as required. This is particularly useful for moving a module, such as a PLET or ILT, from a storage area to a firing line of a pipe laying vessel, since very accurate alignment of the PLET or ILT with the pipeline must be achieved in order to allow them to be connected together by, for example, welding. Such alignment generally will require tilting the article in one or two planes perpendicular to the deck.

The actuator may be arranged between the cradle and the translational movement means. Alternatively the actuator could act between the deck and the translational movement means, the latter moving with the cradle and article together.

Alternatively, the actuator may comprise an actuator discrete from the translational movement means such that the actuator may act directly between the cradle and the vessel. In such an embodiment, the translational movement means may return to a storage/retrieving position whilst the discrete actuator performs the alignment process.

The first and/or second translational movement means may include propulsion means operable to move the bulky article. Alternatively they may be passive devices, moved by externally applied force.

The apparatus preferably includes a plurality of cradles compatible with the translational movement means. By using the intermediary of the cradle, the interface to the movement means can be standardised, while handling many forms of module.

The apparatus may include releasable couplings for anchoring the cradles on deck during transit. The modules to be installed can be pre-assembled onto respective cradles prior to loading the vessel, which saves time in port.

In a preferred embodiment, the first translational movement means provides for skidding of the cradle into position for transfer to the second translational movement means, while the second translational movement means comprises a wheeled frame. The first translational movement means may include transverse rails which allow the cradle to move laterally to and from the vessel centreline and hence to and from the bulky article. A grabbing mechanism which allows the bulky article to be grabbed and slid away from its storage position and onto the transverse rails may also be provided.

References to translational movement are not to be interpreted so strictly as to exclude excluding rotational motion in addition. For example, the first translational movement means may comprise a carousel or turntable, for bringing each cradle/article into engagement with the second translational movement means.

The apparatus may include a plurality of skidding frames each being arranged to interface between a respective cradle and the deck, the skidding frame forming part of the first translational movement means in respect of its respective cradle.

Typically, the operational location is in the pipe laying vessel firing line, so that articles from the storage location can be connected into a pipeline being laid.

The first movement means may be arranged to move said cradle transversely of a centre line of the vessel, while the second translational movement means is arranged to move the cradle longitudinally, that is parallel to the centre line, in order to reach said operational location.

The second translational movement means may comprise a trolley and rails on which the trolley may be driven to said operational location. In a preferred embodiment, the trolley is capable of selectively interlocking with the skidding frame in order to selectively deposit the skidding frame at said first or second longitudinal locations. The interlocking capability may be provided by a pickup mechanism which selectively lifts and lowers the skidding frame to and from a seated position on the deck.

Clearly, the stroking movement of the apparatus requires a portion of the deck space to be cleared from any obstructions. In order to compensate for any resulting decrease in overall deck space available for other operations, there may be provided a channel in the deck, running between the rails along the path of the trolley. A hatch cover, which may comprise part of the skidding frame, may be provided to cover said recess when the trolley is not in use.

In one embodiment, the longitudinal channel is provided substantially along the centre line of the vessel and runs in a fore to aft direction.

The actuator may be provided on the trolley and be capable of actuating the bulky article between upper and lower positions. The actuator may be further capable of actuating between extended and retracted positions in order to actuate the bulky article between fore and aft longitudinal positions.

The actuator may comprise a pair of engagement arms which are telescopically moveable hydraulic arms having a hinged connection to the trolley at one end and a U-shaped engagement bracket at the other end for connection to a corresponding attachment on the cradle.

The actuator allows the orientation of the bulky article to be adjusted relative to the deck of the vessel. This is useful, for example, to assist connection of the bulky article to the pipeline being laid by allowing it to be angled in line with the catenary thereof.

The first translational movement means provided between the cradle and the deck preferably comprises friction reduction means provided on the cradle and corresponding friction reduction means provided on the deck. The friction reduction means may comprise skidding pads on the deck and/or cradle and corresponding skidding rails on the deck and/or cradle. Preferably, the skidding pads and/or rails provided on the deck are releasably secured to the deck in order to allow spacing of the bulky articles in the storage area to be adjusted.

The apparatus may comprise drive means for urging the cradle item from the storage area on the deck onto the second translation movement means. Typically, the drive means comprises a winch and pulley system provided on and moveable with the second translational movement means. Alternatively, one or more short-throw rams may be provided to move the cradle step-wise by repeated operation of the ram.

Preferably, the cradle comprises an L-shaped support in order to provide a support ledge for supporting a lower end of the bulky item and a support back for supporting the length of the bulky article. This minimises the footprint of the bulky article on the deck of the structure. The support ledge and support back may be substantially planar in form, so as to accommodate a wide range of modules on the same form of cradle.

According to the first aspect of the present invention, there is further provided a method of handling bulky articles on a deck of a vessel at sea, the method comprising:
- storing in a supporting cradle at least a bulky article in a storage area on first translational means provided between the cradle and the deck of the structure;
- providing second translational movement means at a loading location adjacent the bulky article;
- sliding the bulky article over the first translational movement means, and onto the second translational movement means;
- moving the translational means from the loading location to an operational location; and
- adjusting the orientation of the bulky article relative to the deck using at least an actuator provided between the second translational movement means and the bulky article.

The bulky article may comprise a module such as a PLET or ILT to be installed in a pipe line being laid by the vessel.

The step of moving the second translational movement means along the deck may be performed using a trolley moveable from a first longitudinal location on the deck to a second longitudinal location on the deck.

The method may preferably include the step of storing a plurality of bulky articles on their cradles in the storage area of the deck to allow random access to a particular bulky article on its cradle by moving the second translational movement means to a location along the deck adjacent the particular bulky article required. The plurality of bulky articles may be stacked on one end thereof in order to reduce their footprint on the deck of the vessel.

The method may further include the step of returning the second translational movement means to a further loading location adjacent a further bulky item upon deployment of the first bulky article on its cradle at the operational location.

Optionally, the method includes selective lowering of the bulky article using the actuator in order to allow it to pass by certain structures on the vessel, for example, between the legs of a pipe-laying tower.

The method may include an initial step of placing the bulky articles on the deck of the vessel in a single operation where the bulky article, cradle and at least part of the first translational movement means are all secured together in a unit which may be lifted onto the deck of the vessel in a single lifting operation.

The step of adjusting the orientation of the bulky article on its cradle relative to the deck using at least an actuator may comprises the step of actuating the bulky article on its cradle between upper and lower positions and actuating the bulky article between extended and retracted longitudinal positions.

The step of sliding the bulky article on its cradle over the first translational movement means may optionally comprise moving the bulky article from the storage area on the deck onto the second translational movement means using drive means such as a winch and pulley system provided on and moveable with the second translational movement means.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1A:
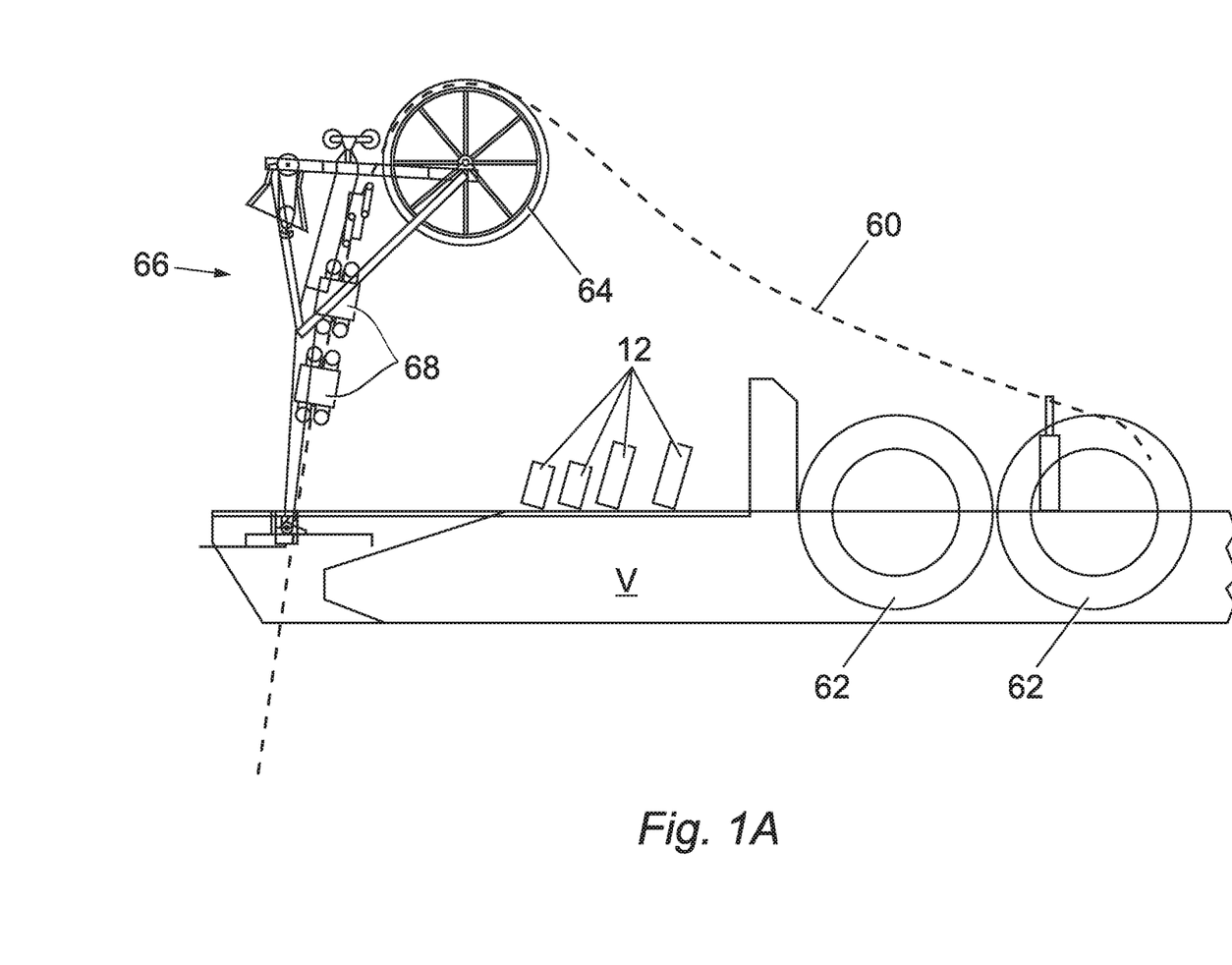
FIG. 1A is a transverse schematic view of a vessel provided with apparatus according to aspects of the invention, where a plurality of modules (PLETs) are positioned on cradles in a storage area of the deck and are ready to be deployed to the vessel firing line as required.
Figure 1B:
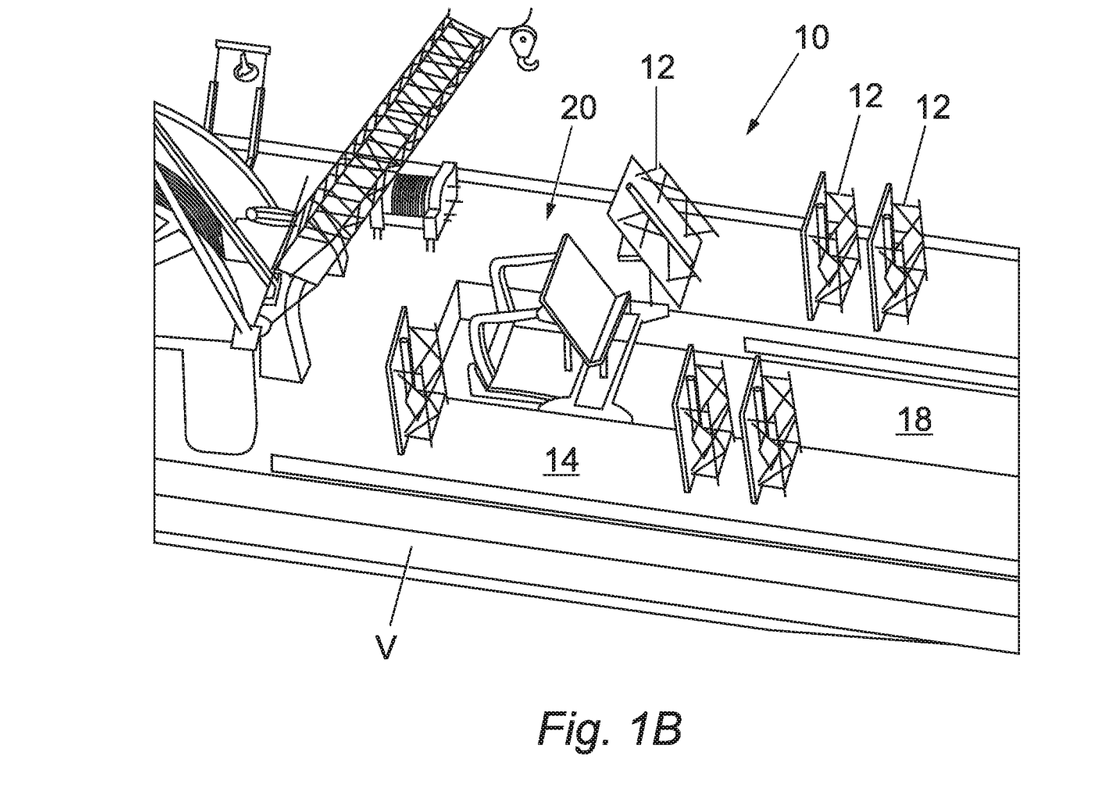
FIG. 1B is a schematic perspective illustration of the apparatus of FIG. 1A.
Figure 2:
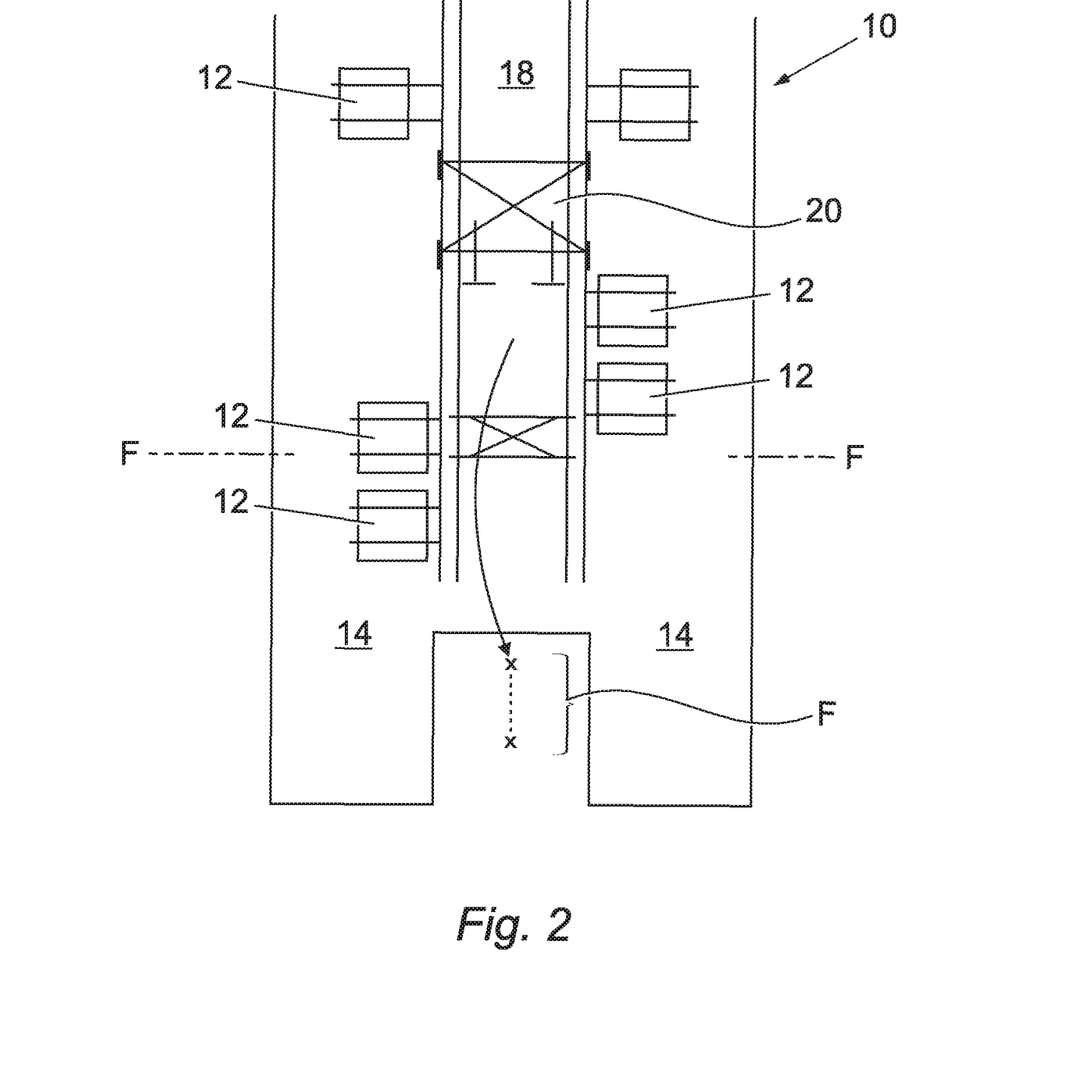
FIG. 2 is a schematic plan view of the apparatus according to the present invention.
Figures 3A, 3B, 3C:
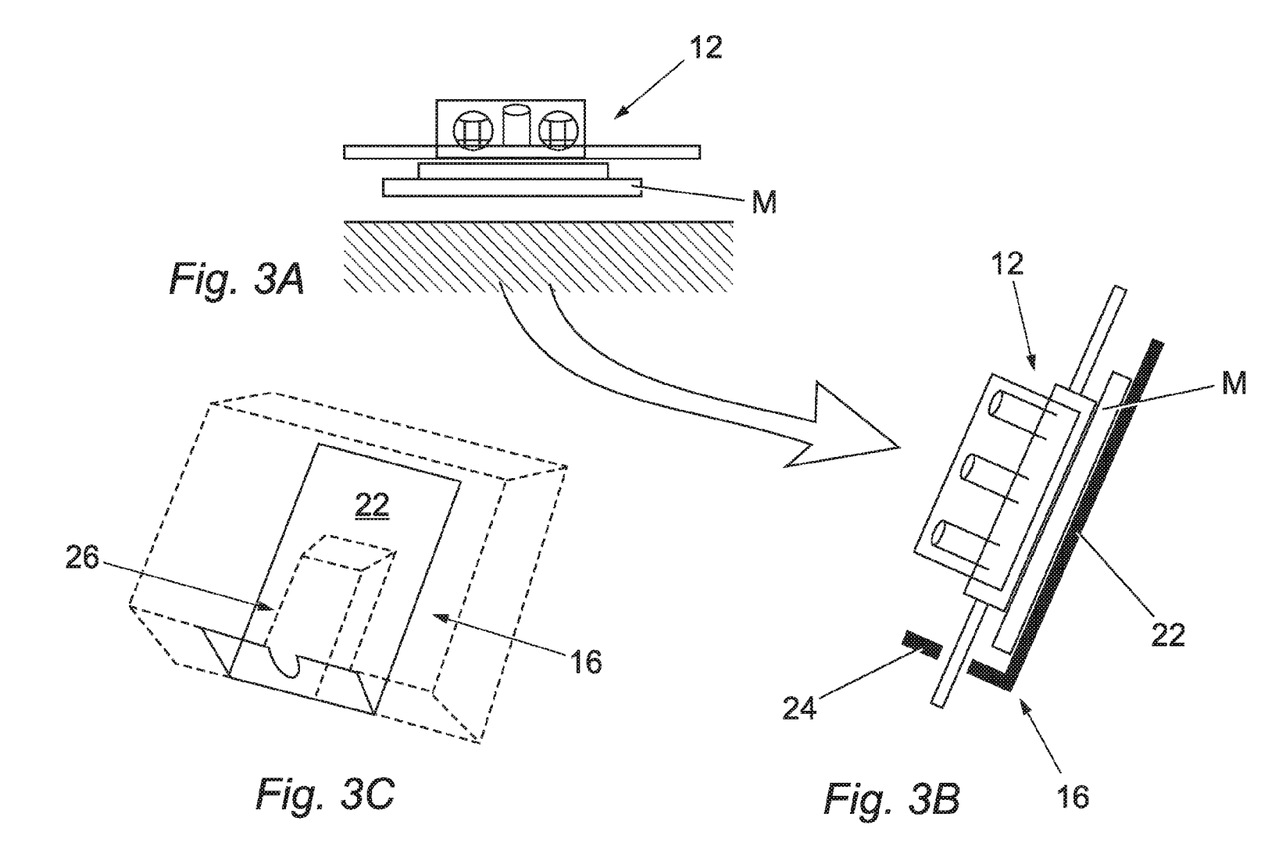
FIG. 3A is a sketch of a transverse view of a PLET resting on its mud mat on a horizontal surface prior to being secured on a supporting cradle.
FIG. 3B is a transverse view of the PLET of FIG. 3A secured on a cradle in a near vertical stacking configuration.
FIG. 3C is a perspective view of the front of the cradle of FIG. 3B illustrating in broken lines the intended position of small and large modules that can be carried on the same cradle.

FIGS. 1A, 1B and 2 show in schematic form the basic components of a system, suitable for deploying reeled pipeline from a vessel to the sea bed. The system is mounted on a vessel V. The pipeline 60 is fed from one of a pair of reels 62 over an aligner wheel 64 of a pipeline laying tower 66 and down the vessel firing line toward the sea bed in a known manner. In the specific embodiment described, the apparatus 10 is described in relation to manoeuvring modules (such as PLETs or ILTs) on the deck 14 of the pipe-laying vessel V.

The apparatus 10 includes a series of L-shaped cradles 16 (best seen in FIGS. 3 and 4), each supporting a module in a storage location along either side of the deck 14. Each cradle 16 provides a planar support back 22 which intersects at right angles with a support ledge 24 at its lower end. The face of the mud mat M of a typical module rests on the planar support back 22 while the edge of the mud mat M rests on the support ledge 24. In this regard, the support ledge 24 may have a cut-out portion 26 which accepts a protruding part (such as a portion of connecting pipeline) of the module 12. The cradle back 22 and ledge 24 provides an angled support which allows the modules to be stacked in rows in a near vertical position in order to save storage space by minimising the footprint of the module on the deck 14.

A longitudinal channel forms a tween deck 18 which runs from a forward position between the rows of modules back along the vessel centreline to an operational location in the firing line at the stern. The tween deck 18 may comprise a custom designed channel specific to this application or may be a generic channel which is used for other operations on the vessel.

Translational movement means 20 (or translational support means), is located above the tween deck 18 and can move longitudinally along its length in the fore/aft direction. As shown in FIGS. 10A to 10D, the translational movement means comprises skidding frame 32, trolley 31 and a pick-up mechanism 33 for selectively interlocking the skidding frame 32 and trolley 31 together. The pick-up mechanism 33 is also capable of lifting the skidding frame 32 from its seated position on the shoulders of either side of the tween deck 18 when required, thereby transferring the weight of the skidding frame 32 to the upper deck 14 through the trolley 31, wheels 35 and rails 37. This provides a convenient way of moving the skidding frame back and forth, although it can be provided with separate drive arrangements, if desired.

Figure 7:
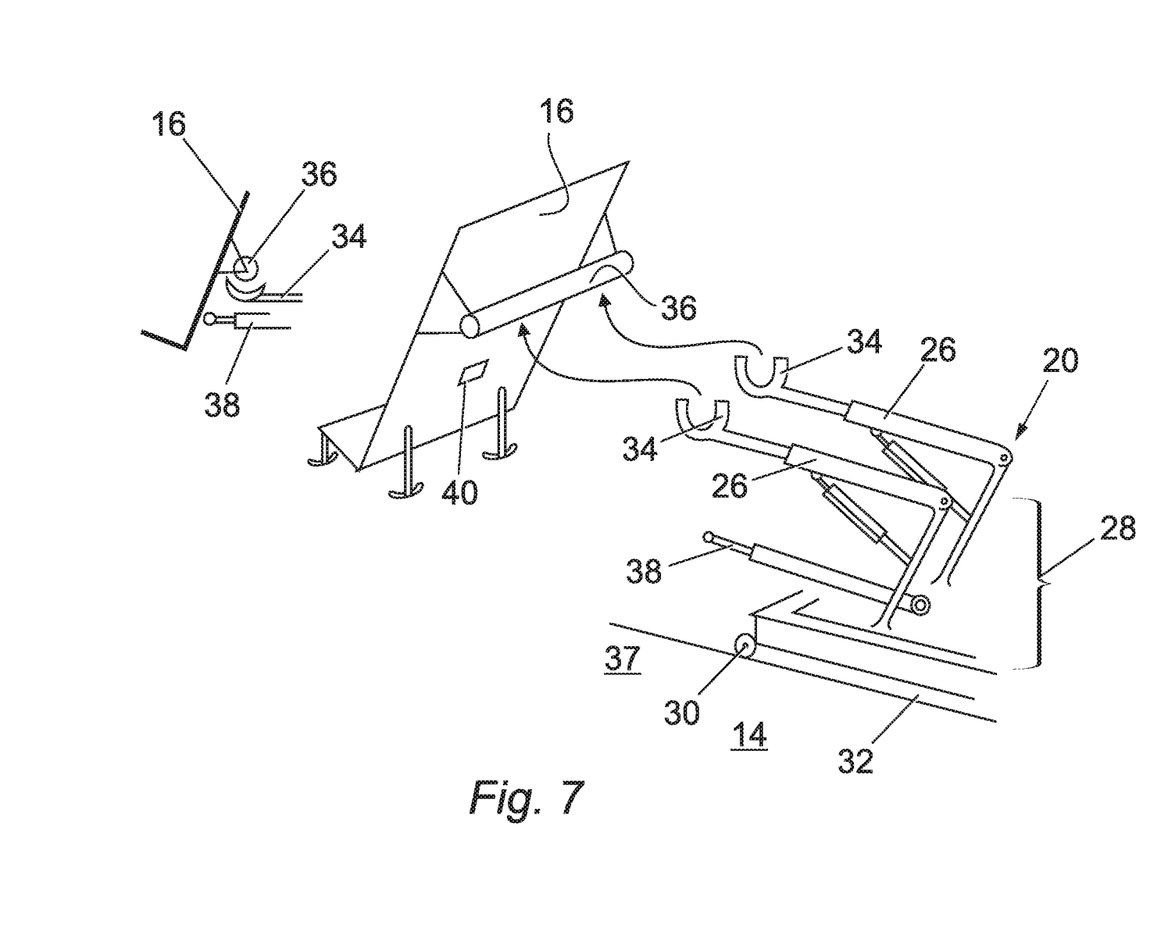
FIG. 7 is a perspective view of a trolley prior to connection to the rear of a cradle.
Figure 8:
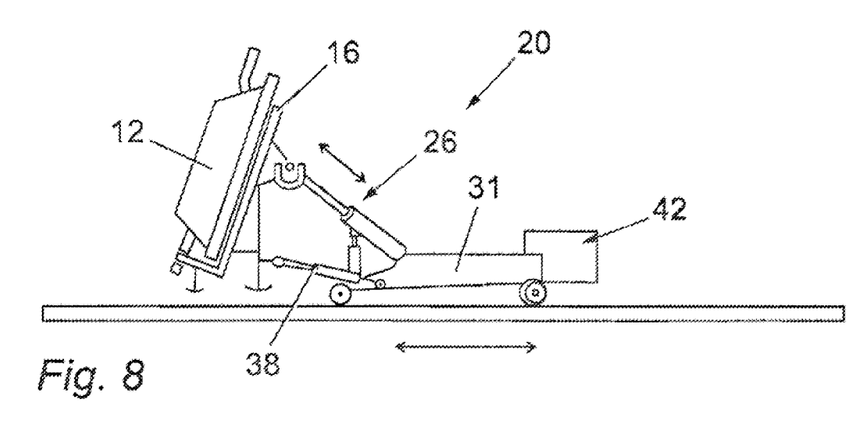
FIG. 8 is a transverse sketch of the PLET being moved in the fore-aft direction by the trolley.

With reference to FIG. 7, the trolley 31 is also provided with actuators in the form of hydraulic arms 26. The hydraulic arms are connected to a base frame 28 of the trolley which can slide along the channel 18 on wheels 35 running on rails 37. As seen in FIG. 7, one end of each hydraulic arm 26 has a u-shaped bracket 34 which allows the whole translational movement member 20 to engage with a corresponding bracket 36 on the cradle 16. The length of the hydraulic arms 26 can also be telescopically increased or decreased. Lower connection member 38 abuts against a corresponding contact surface 40 on the rear of the cradle 16. It may be desirable to attach a counter balance 42 to the rear of the skidding frame 32 in order to balance the trolley 31 and minimise the likelihood of it tipping under the weight of the module 12.

At the storage area, translational movement means are provided between the cradle 16 and the deck 14. The translational movement means comprises skidding pads 42 attached to the end of legs 44 on the cradle 16 and skidding rails 46 secured to the deck 14. The faces of the skidding pads 42 and the rail head 46 are shaped and finished in order to provide a friction reducing surface. As well as being provided on the deck 14, the rails 46 are also provided on the base of the skidding frame 32 in order to provide a smooth transition of the module 12 from the sides of the deck onto the skidding frame 32. The rails 46 may be temporarily secured to the deck in order to allow them to be relocated along the deck such that they correspond with the location of a particular module 12. This is advantageous since it is much easier to move the rails 46 to suit the position of the module 12 on the deck rather than move it to suit the positions of the rails.

Figure 4A:
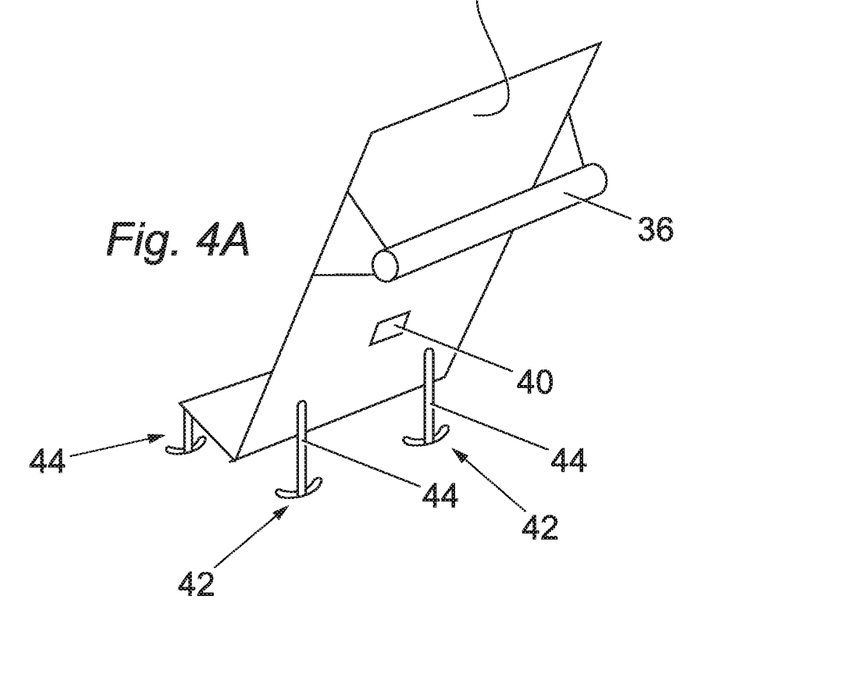
FIG. 4A is a rear view of the cradle of FIG. 3B and 3C showing planar movement means according to the present invention.
Figure 4B:
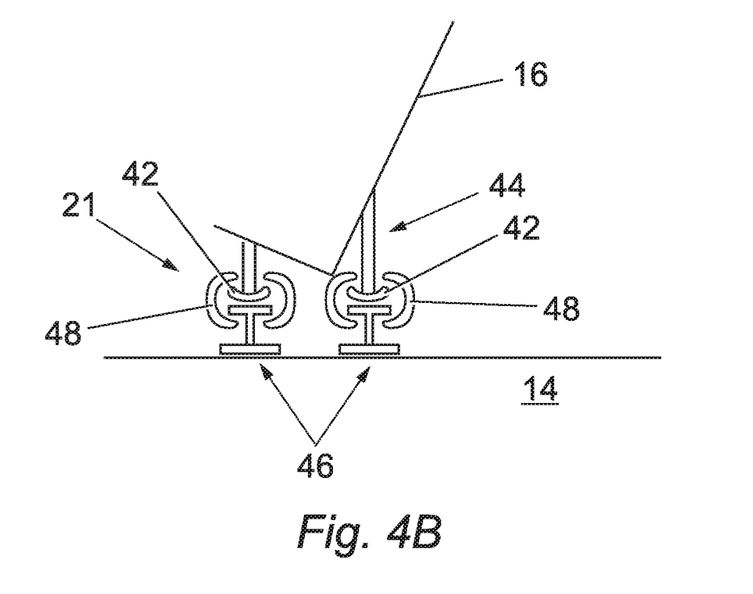
FIG. 4B is transverse view of the cradle of FIG. 4A showing, in detail, the planar movement means.
Figure 5:
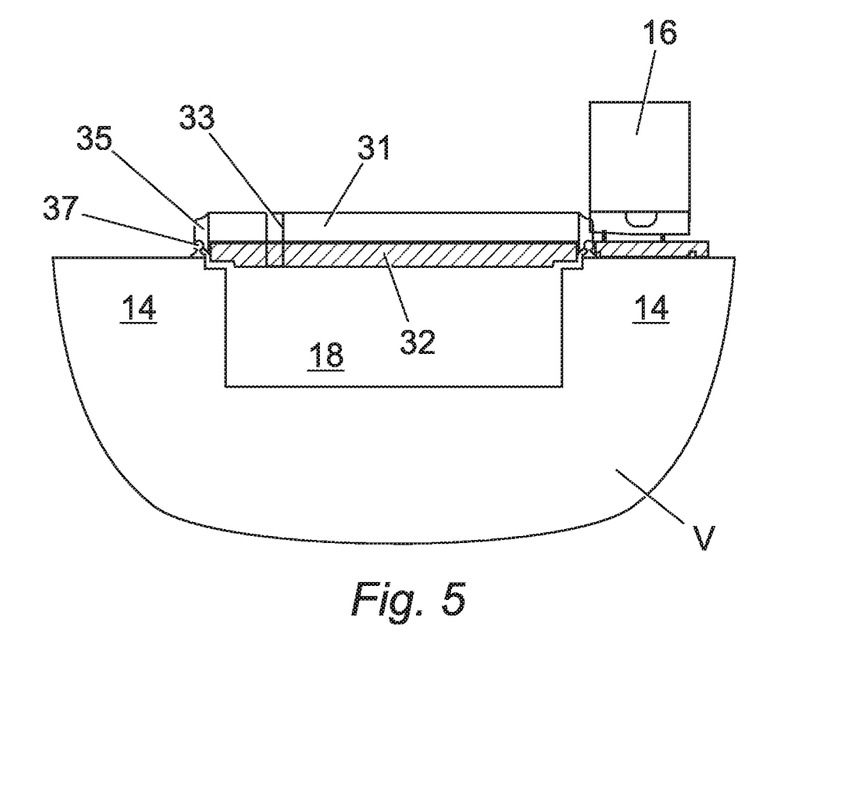
FIG. 5 is a partial cross sectional end view of the vessel showing interlocking of the skidding frame and trolley.

During transfer of the module 12 onto the skidding frame 32, releasable couplings illustrated by 48 in FIG. 4B are clamped around either side of the skidding pads 42 and rail 46 in order to prevent the module 12 from slipping off the rails 46 and/or tipping over.

When transferring modules 12 onto the vessel from an onshore base, it is advantageous to lift each module, cradle 16, skidding pads 42 and skidding rails 46 (attached to the underside of the skidding pads 42) onto the vessel as a single unit in one lifting operation.

In use, during normal pipe laying, the modules are stored in a storage location of the upper deck 14 along either side of the vessel. The near vertical stacking of the modules 12 in the storage location increases storage space on the vessel deck and also minimises any disruption caused by the modules 12 to the normal pipe laying process. At this stage the trolley 31 and skidding frame 32 are also in a storage position which may be at a full forward position as shown in FIG. 1B.

When a module 12 is required at the firing line F, the pick up mechanism 33 is engaged in order to interlock the skidding frame 32 and trolley 31. The trolley 31 is then moved aftward along rails 37 from its storage position until it is in line with the required module 12. Movement of the trolley may be performed by any suitable means such as a winch or short-throw rams. Alignment between skidding frame and the required module 12 may be carried out visually by onboard crew or may alternatively be carried out automatically using a suitable sensor.

Once the skidding frame is accurately positioned next to the required module 12, the pick-up mechanism 33 is disengaged in order to lower the skidding frame 32 into a seated position over the channel 18 of the deck 14. The trolley 31 is then moved again to a forward position thereby depositing the skidding frame in the required position.

Before the module 12 can be moved across onto the skidding frame 32, releasable couplings 48 are secured around the rails 46 and skidding pads 42 (FIG. 4B) in order to prevent the module slipping off the rails 46. The module is then slid across the rails 46 on the deck 14 onto corresponding rails 46 on the skidding frame 32 until the weight of the module 12 rests on the skidding frame 32.

Figure 6:
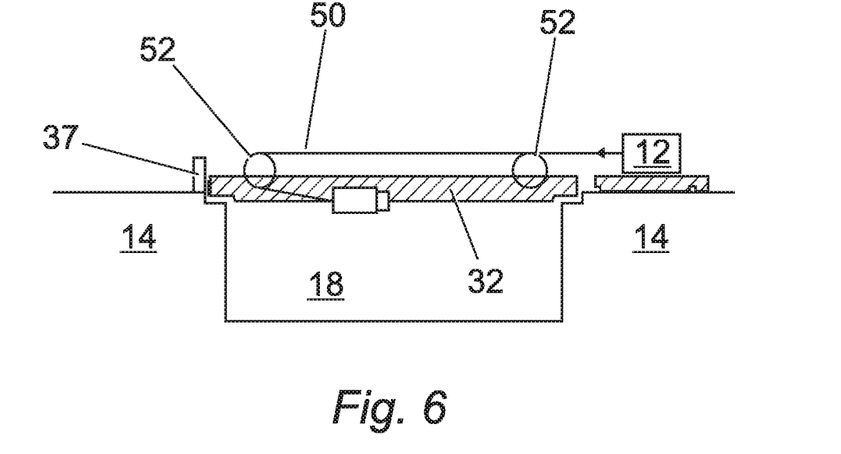
FIG. 6 is a further partial cross sectional view of the apparatus of FIG. 5 showing the plane movement drive means.

With reference to FIG. 6, movement of the module 12 across the rails 46 is performed by a winch 48, pulley cable 50 and retractable sheaves 52, which themselves may be part of the skidding frame 32.

Once the module 12 has been positioned on the skidding frame 32, the hydraulic arms 26 of the trolley are raised until each u-shaped bracket 34 connects with the corresponding bar shaped bracket 36 on the cradle 16. The cradle 16 and the module 12 are now secured to the skidding frame 32 and trolley 31.

Figure 9:
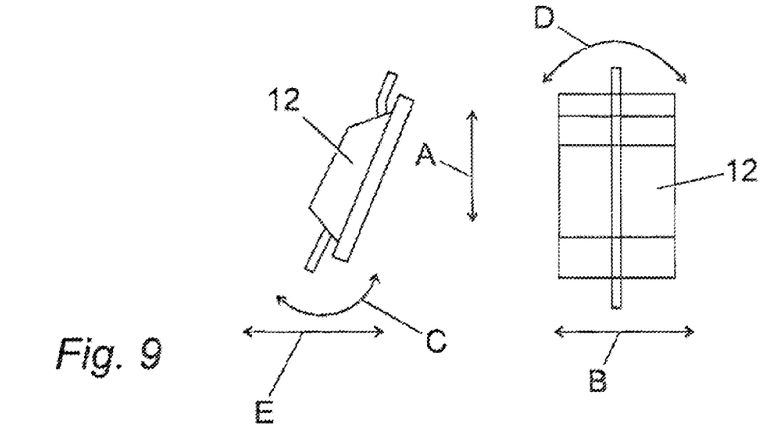
FIG. 9 is an illustration of the degrees of freedom of PLET movement provided by the apparatus according to the present invention.
Figure 10A:
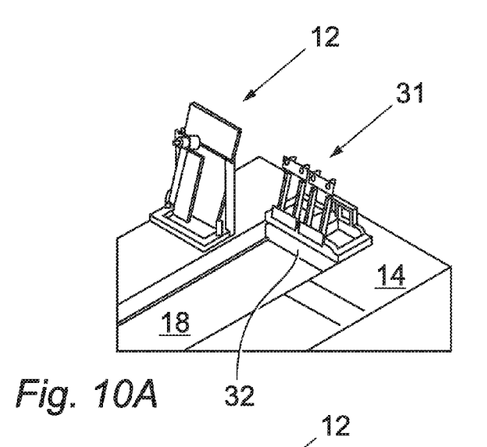
FIG. 10A is a perspective schematic illustrating the trolley in an initial staring position prior to translation of the PLET along the length of the vessel.
Figure 10B:
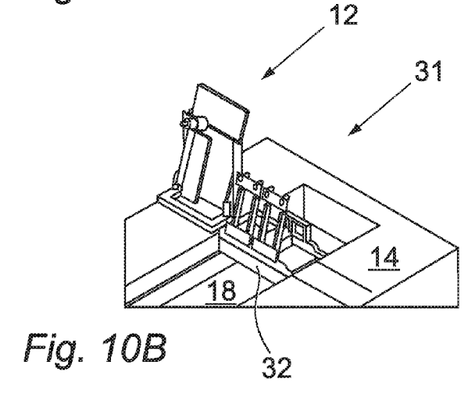
FIG. 10B is a perspective schematic of the apparatus of FIG. 10A where the trolley and skidding frame have been moved aft until they are each in line with the PLET to be moved.
Figure 10C:
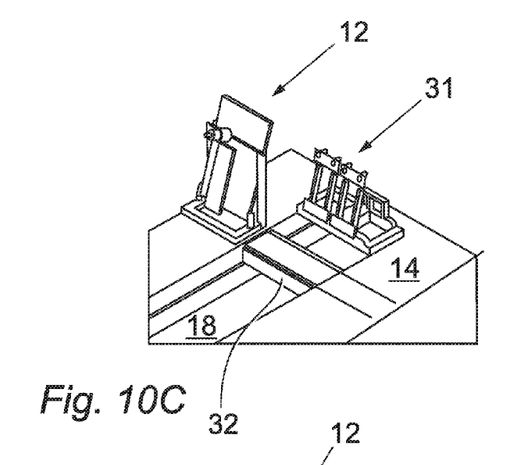
FIG. 10C is a view of the apparatus of FIG. 10B where the trolley has been moved again to a forward position, thereby depositing the trolley adjacent the PLET to be moved.
Figure 10D:
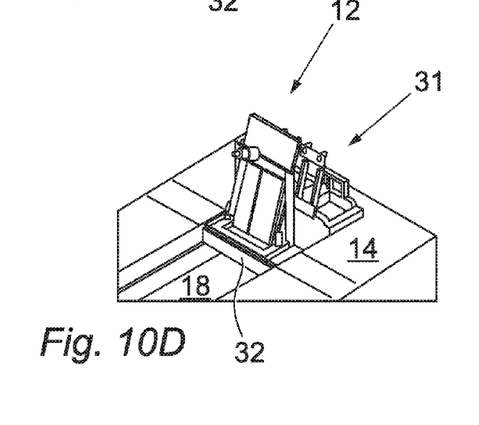
FIG. 10D is a view of the apparatus of FIG. 10C where the PLET has been slid in the plane of the deck onto the skidding frame ready for translation to the vessel firing line.

The trolley 31 and skidding frame 32 are now moved aftward toward an operational location, typically the vessel firing line F. In this regard, it may be necessary to use the hydraulic arms 26 to lower the module 12 as it is moving aftward in order to allow, for example, the module 12 to pass between the legs of the vessel's laying tower. With reference to FIG. 9, once at the firing line F, the pair of hydraulic arms 26 may be independently lowered, raised, extended and retracted in order to move the module up and down (indicated by arrow A), move it side to side (indicated by arrow B), pitch it back and forward (indicated by arrow C), or tilt it from side to side (indicated by arrow D). The actuation arms 26 and lower connection member 38 may also be extended or retracted simultaneously in order to allow relatively fine adjustments to the position of the module 12 in the longitudinal direction (indicated by arrow E). This arrangement allows the module 12 to be easily manipulated into any orientation when at the firing line F. This is useful when aligning the module during welding to the pipeline by allowing the module orientation to match, for example, the catenary angle of the pipeline being laid.

Once the module 12 has been attached and deployed at the firing line F, the trolley 31 and may be moved forward away from the firing line F toward the remaining modules 12 stored on the deck 14 of the vessel. The previously described process is then repeated for each required module. In this way the modules 12 can be randomly accessed from the deck 14; in other words, a module 12 from the middle of either row of stacked modules 12 may be accessed without moving any of the other modules 12. Furthermore, if desired, rather than taking modules 12 from the storage area to the firing line F, the apparatus may be used to move the modules 12 around the deck 14 as required (for example from fore to aft or from one side of the deck 14 to the other).

An advantage of the system described is that it removes the need to use a crane to lift the modules off the deck and hoist them into place on the firing line. The system is therefore much less susceptible to delays due to bad weather. Oversized structures, may not be compatible with this system since they may not pass through the legs of the laying tower; however, such structures may instead be hoisted around the legs of the laying tower by a crane in the traditional manner.

The provision of the cradle between the deck and the module has the advantage of allowing a generic cradle to be used for different forms of modules. This desirably introduces a degree of standardisation into the system.

The arrangement also provides a quick loading capability by making it possible to have the modules prepared onshore in a single unit including the module itself, the cradle, skidding rails of the translational movement means, and any other associated components. A number of such units may be lined up on-shore adjacent the vessel and then lifted onto the deck of the vessel in a single lifting operation when required. Fittings on the deck can be provided at standard pitch for rapid fastening and releasing of these assemblies during loading, unloading and deployment.

Figure 11A:
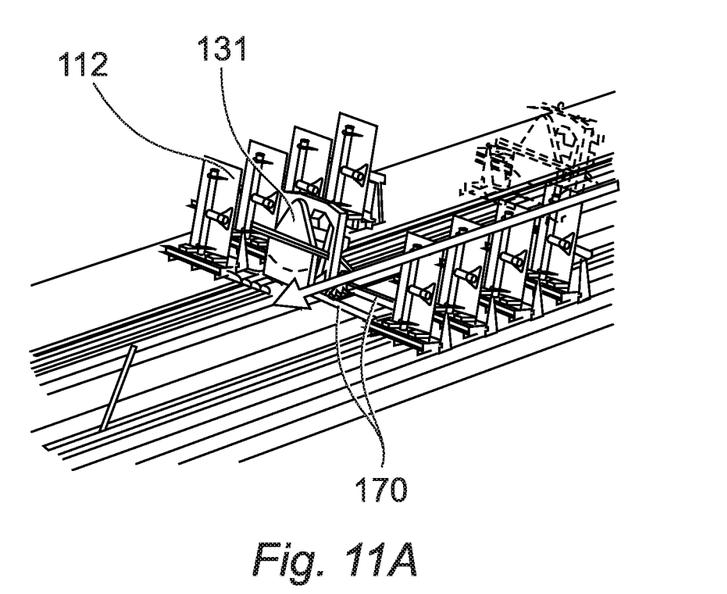
FIG. 11A is a view of an alternative embodiment of the invention where the trolley is capable of moving transversely from the vessel centreline to meet the PLET.
Figure 11B:
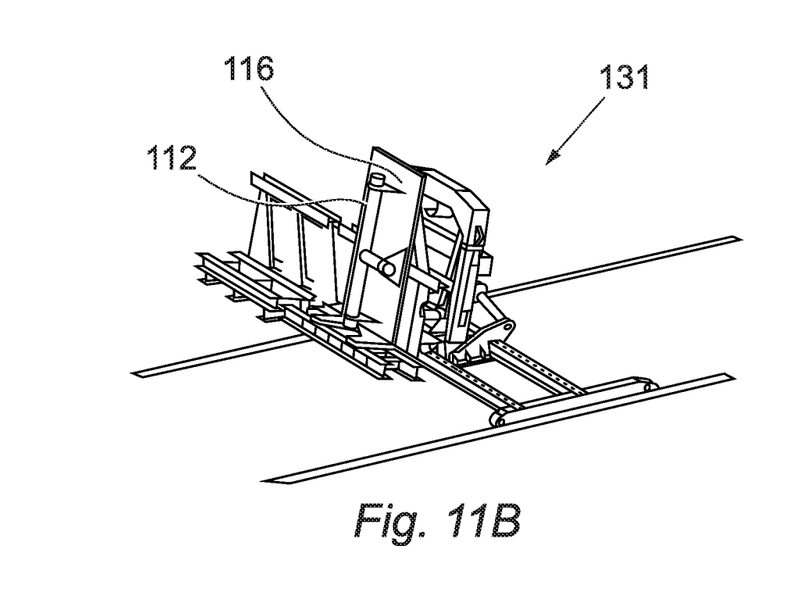
FIG. 11B is a further view of the apparatus of FIG. 11A, where the PLET has been dragged from its storage position by a grabbing mechanism provided on the trolley.

Modifications and improvements may be made to the foregoing without departing from the spirit and scope of the invention. For example:

In the embodiment shown in FIG. 11A and 11B, the longitudinal translational movement means, is provided with transverse rails 170 that allow the trolley 131 to move laterally to and from the vessel centreline and hence to and from the PLET 112 and associated cradle 116. Once the trolley 131 is adjacent the required PLET 112, a grabbing mechanism is deployed from the trolley 131 to couple with the cradle 116. The grabbing mechanism then slides the cradle 116 and associated PLET 112 onto the trolley 131. The trolley 131, cradle 116 and PLET 112 are now returned to the vessel centreline on the transverse rails 170 in preparation for longitudinal movement along the vessel centreline and toward the pipe laying axis.

The trolley may have hinged portions which allow portions of it to fold away in order to minimise any impact on the spooling configuration of the pipe laying vessel. The modules 12 may also be provided with working stations allowing certain weld preparation operations to be performed off line (for example, bevelling).

The skidding frame 32 could also be provided with a hatch cover for covering part of the channel 18. Further covers can be fitted to provide a flatter deck for working and storage when the trolley is not in use.

The invention claimed is:

1. A pipelaying vessel having a laying tower for handling and lowering pipe into the sea along a laying axis, a deck, a storage area, and positioning apparatus for positioning a structure on the deck for inclusion in a pipeline to be laid while the pipelay vessel is moving, the positioning apparatus comprising:
    a cradle for supporting the structure, wherein the structure is stored mounted on the cradle in a storage position in the storage area;
    a first translational movement mechanism provided between the deck and the cradle;
    a second translational movement mechanism moveable along the deck,
    wherein the first translational movement mechanism is adapted to move the structure on its cradle from the storage area and to transfer it on to the second translational movement mechanism when the cradle and the second translational movement mechanism are aligned, and
    wherein the second translational movement mechanism is adapted to move the structure on its cradle toward an operational location generally beneath the tower; and
    at least one actuator provided between the deck and the cradle, the actuator being operable to adjust the orientation of the structure relative to the deck, when in said operational position, thereby to align it with the laying axis for inclusion in the pipeline as it is laid from the pipelay vessel.

2. The pipelaying vessel as claimed in claim 1, wherein the actuator is arranged between the cradle and the second translational movement mechanism.

3. The pipelaying vessel as claimed in claim 1, wherein the actuator acts between the deck and the second translational movement mechanism, the latter moving with the cradle and the structure together.

4. The pipelaying vessel as claimed in claim 1, wherein the actuator comprises an actuator discrete from the second translational movement mechanism such that the actuator may act directly between the cradle and the vessel.

5. The pipelaying vessel as claimed in claim 1, wherein the first and/or second translational movement mechanism includes a propulsion mechanism operable to move the structure.

6. The pipelaying vessel as claimed in claim 1, wherein the first and/or second translational movement mechanism comprise passive devices, moved by externally applied force.

7. The pipelaying vessel as claimed in claim 1, the positioning apparatus further comprising a plurality of cradles compatible with the first and second translational movement mechanisms.

8. The pipelaying vessel as claimed in claim 7, the positioning apparatus further comprising releasable couplings for anchoring the cradles on deck during transit.

9. The pipelaying vessel as claimed in claim 7, wherein the first translational movement mechanism provides for skidding of the cradle into position for transfer to the second translational movement mechanism, while the second translational movement mechanism comprises a wheeled frame.

10. The pipelaying vessel as claimed in claim 7, wherein the first translational movement mechanism includes transverse rails to support one of the plurality of cradles supporting a structure thereon as it is moved laterally to and from a centerline of the vessel and hence to and from the storage position.

11. The pipelaying vessel as claimed in claim 10, the positioning apparatus further providing a grabbing mechanism to grab one of the plurality of cradles supporting a structure thereon and slide it away from the storage position and onto the transverse rails.

12. The pipelaying vessel as claimed in claim 7, the positioning apparatus further comprising a plurality of skidding frames each being arranged to interface between a respective cradle and the deck, the skidding frame forming part of the first translational movement mechanism in respect of its respective cradle.

13. The pipelaying vessel as claimed in claim 1, wherein the first translational movement mechanism is arranged to move said cradle transversely of a center line of the vessel, while the second translational movement mechanism is arranged to move the cradle longitudinally, parallel to the center line, in order to reach said operational location.

14. The pipelaying vessel as claimed in claim 1, wherein the second translational movement mechanism comprises a trolley and rails on which the trolley is driven to said operational location.

15. The pipelaying vessel as claimed in claim 14, wherein the trolley is adapted to interlock selectively with the skidding frame in order to selectively deposit the skidding frame at said first or second longitudinal locations.

16. The pipelaying vessel as claimed in claim 14, wherein the actuator is provided on the trolley and is capable of actuating movement of the structure between an upper position and a lower position.

17. The pipelaying vessel apparatus as claimed in claim 16, wherein the actuator is further capable of actuating between an extended position and a retracted position in order to actuate movement of the structure between fore and aft longitudinal positions.

18. The pipelaying vessel as claimed in claim 14, wherein the actuator comprises a pair of engagement arms which are telescopically moveable hydraulic arms having a hinged connection to the trolley at one end and a U-shaped engagement bracket at the other end for connection to a corresponding attachment on the cradle.

19. The pipelaying vessel to as claimed in claim 1, wherein the first translational movement mechanism provided between the cradle and the deck comprises skidding pads on the deck and/or cradle and corresponding skidding rails on the deck and/or cradle.

20. The pipelaying vessel as claimed in claim 19, wherein the skidding pads and/or rails provided on the deck are releasably secured to the deck in order to allow spacing of the structures in the storage area to be adjusted.

21. The pipelaying vessel as claimed in claim 1, wherein the positioning apparatus comprises a winch and pulley system provided on and moveable with the second translational movement mechanism for urging the cradle from a storage area on the deck onto the second translation movement mechanism.

22. The pipelaying vessel as claimed in claim 1, wherein the positioning apparatus comprises one or more short-throw rams to move the cradle step-wise by repeated operation of the ram for urging the cradle from the storage area onto the second translation movement mechanism.

23. The pipelaying vessel as claimed in claim 1, wherein the cradle comprises an L-shaped support in order to provide a support ledge for supporting a lower end of the structure and a support back for supporting the structure along its length.

24. The pipelaying vessel as claimed in claim 1, wherein the structure, the cradle, and at least a part of the first translational mechanism are all securable together in a unit which is removably located on the vessel.

* * * * *

UNITED STATES PATENT AND TRADEMARK OFFICE
CERTIFICATE OF CORRECTION

PATENT NO.        : 8,752,618 B2  Page 1 of 1
APPLICATION NO.   : 12/672949
DATED             : June 17, 2014
INVENTOR(S)       : Jean-Baptiste Pose It is certified that error appears in the above-identified patent and that said Letters Patent is hereby corrected as shown below:

On the title page item (73) for the Assignee's name should read -- Subsea 7 Contracting (UK) Limited --

Signed and Sealed this
Sixteenth Day of September, 2014

Michelle K. Lee
*Deputy Director of the United States Patent and Trademark Office*